US006177951B1

United States Patent
Ghosh

(10) Patent No.: US 6,177,951 B1
(45) Date of Patent: *Jan. 23, 2001

(54) DIGITAL RECEIVER WHICH UTILIZES A REJECTION FILTER FOR CANCELLATION OF KNOWN CO-CHANNEL INTERFERENCE AND AN EQUALIZER FOR EQUALIZING MULTIPATH CHANNELS WITHOUT ATTEMPTING TO EQUALIZE THE CO-CHANNEL INTERFERENCE

(75) Inventor: Monisha Ghosh, Mohegan Lake, NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/768,474

(22) Filed: Dec. 18, 1996

(51) Int. Cl.⁷ ............................. H04N 5/21; H04N 5/213; H04N 5/217
(52) U.S. Cl. ...................... 348/21; 348/192; 348/193; 375/346; 375/347
(58) Field of Search ............................. 348/21, 608, 609, 348/613, 192, 193; 375/346, 347, 349, 350; 455/323, 306, 307; H04N 5/21, 5/213, 5/217

(56) References Cited

U.S. PATENT DOCUMENTS

| 5,119,196 | * | 6/1992 | Ayanoglu et al. | 348/614 |
|---|---|---|---|---|
| 5,291,291 | * | 3/1994 | Eilers | 348/723 |
| 5,321,725 | * | 6/1994 | Paik et al. | 348/155 |
| 5,341,177 | * | 8/1994 | Roy et al. | 348/614 |
| 5,361,102 | * | 11/1994 | Roy et al. | 348/614 |
| 5,438,369 | * | 8/1995 | Citta et al. | 348/605 |
| 5,452,015 | * | 9/1995 | Hulyalkar | 348/608 |
| 5,475,444 | * | 12/1995 | Kim | 348/608 |
| 5,479,449 | * | 12/1995 | Patel et al. | 375/316 |
| 5,481,316 | * | 1/1996 | Patel | 348/608 |
| 5,502,506 | * | 3/1996 | Choi | 348/607 |
| 5,508,752 | * | 4/1996 | Kim et al. | 348/470 |
| 5,512,957 | * | 4/1996 | Hulyalkar | 348/607 |
| 5,572,249 | * | 11/1996 | Ghosh | 348/608 |
| 5,572,262 |   | 11/1996 | Ghosh | 348/607 |
| 5,619,269 | * | 4/1997 | Lee et al. | 348/432 |
| 5,675,394 | * | 10/1997 | Choi | 348/614 |

* cited by examiner

Primary Examiner—Nathan Flynn
Assistant Examiner—Vivek Srivastava
(74) Attorney, Agent, or Firm—Laurie E. Gathman

(57) ABSTRACT

A digital receiver (e.g., an ATV or HDTV receiver) which receives digital signals (e.g., ATV or HDTV signals), and which includes an equalizer for equalizing multipath channels having known co-channel interference (e.g., co-channel NTSC interference) present therein. A co-channel interference rejection filter is inserted in the digital receiver upstream of the equalizer, and the equalizer is modified in such a manner that it will not attempt to equalize the co-channel interference. Thus, co-channel interference cancellation is done primarily by the rejection filter, while multipath equalization (correction) is the exclusive function of the equalizer. This leads to better co-channel performance than that which can be obtained by relying on the equalizer alone to perform both functions. The co-channel interference rejection filter is preferably a multi-tap filter having fixed filter coefficients which are designed to optimize cancellation of the known co-channel interference.

18 Claims, 3 Drawing Sheets

DIGITAL RECEIVER WHICH UTILIZES A REJECTION FILTER FOR CANCELLATION OF KNOWN CO-CHANNEL INTERFERENCE AND AN EQUALIZER FOR EQUALIZING MULTIPATH CHANNELS WITHOUT ATTEMPTING TO EQUALIZE THE CO-CHANNEL INTERFERENCE

BACKGROUND OF THE INVENTION

The present invention relates generally to digital receivers which operate in an environment in which known co-channel interference is present, and, more particularly, to a digital television receiver, such as an HDTV receiver, which utilizes a rejection filter for cancellation of known co-channel interference, e.g., co-channel NTSC interference, and an equalizer for equalizing multipath channels without attempting to equalize the known co-channel interference.

The Federal Communications Commission (FCC) has recently approved an advanced television (ATV) standard which encompasses high definition television (HDTV) and standard definition television (SDTV) signals for terrestrial broadcasting. The HDTV signals will be encoded in accordance with the MPEG-2 coding protocol (as described in the ISO/IEC 13818 document), where "MPEG" is an acronyn for the "Moving Pictures Experts Group" which proposed this coding standard. The RF transmission scheme which will likely be used is the trellis-coded 8-VSB (Vestigial SideBand) system developed by Grand Alliance member Zenith Electronics. This system is described in detail in a publication entitled "VSB Transmission System: Technical Details", Feb. 18, 1994, the disclosure of which is incorporated herein by reference.

The FCC will require that ATV signals initially (for at least several years) be broadcast using currently unused analog NTSC television channels (sometimes referred to as "taboo" channels), since ATV broadcasting systems will, at least for this initial period, have to co-exist with conventional analog NTSC broadcasting systems. The resultant simultaneous broadcasting of digital ATV and analog NTSC television signals is oftentimes referred to as "simulcasting". A practical HDTV receiver must be capable of cancelling the resultant co-channel NTSC interference without excessively enhancing noise, in order to function properly. In this regard, a number of different solutions have been previously proposed, as summarized below.

An 8-VSB system developed by Zenith Electronics combats co-channel NTSC interference by using a comb filter in the HDTV receiver to introduce nulls in the digital spectrum at the frequency locations of the NTSC picture, color, and sound carriers. When co-channel NTSC interference is present at the HDTV receiver, the comb filter is treated as a partial response channel in cascade with the trellis decoder. A significant drawback of this approach to combating co-channel NTSC interference is that the performance of the comb filter, and thus, the overall performance of the HDTV receiver, is significantly degraded when co-channel NTSC interference and a high level of additive white Gaussian noise (AWGN) are present in the received signal. This is because the AWGN does not remain white after it is filtered by the comb filter, but gets "colored", meaning that the noise samples are not taken independently of each other. This, in turn, adversely affects the performance of the trellis decoder, which is optimized for performance in an AWGN channel. Another significant drawback of this approach to combating co-channel NTSC interference is that the comb filter must be switched out in the absence of co-channel NTSC interference, because it would otherwise excessively enhance noise.

U.S. Pat. No. 5,291,291, issued to Eilers, discloses an ATV system with reduced co-channel NTSC interference, in which the NTSC receiver subjective random noise sensitivity characteristic is utilized to shape the ATV transmitter power curve. A complementary filter is incorporated in the ATV receiver for compensating for the shaped ATV transmitter power curve. The shaped ATV power curve emphasizes signals at the frequencies where the NTSC subjective random noise sensitivity is low and deemphasizes signals at the frequencies where NTSC subjective sensitivity is high. Significant drawbacks of this approach to combating co-channel NTSC interference are that it requires modification of the ATV transmission system, and requires costly and complex modifications of the ATV receiver.

U.S. Pat. Nos. 5,452,015 and 5,512,957, both of which issued to Hulyalkar, and both of which are assigned to the assignee of the present invention, disclose an ATV system including an encoding/transmission system which includes a "bi-rate" control block (to select between 8-VSB and 4-VSB modulation) and respective 8-VSB and 4-VSB "trellis-precoding" blocks, and an ATV receiver having a decoder which is designed to process the subset-limited trellis pre-coded ATV signal which is transmitted by the transmitter. The disclosures of these two patents are incorporated herein by reference.

The Hulyalkar ATV receiver utilizes a co-channel NTSC inteference rejection filter and a decoder which processes co-channel NTSC interference in such a manner as to produce a residual interference spectrum which is as flat as possible at the output of the rejection filter. The filter exploits the fact that only the picture and the sound carriers need to be sufficiently attenuated and cancels co-channel NTSC interference with only a small degradation in performance when AWGN is present. Drawbacks of this approach to combating co-channel NTSC interference are that it requires the use of a "subset-limited trellis-coding" precoder in the transmitter of the ATV transmission system (thus changing the transmission stream) and a corresponding decoder and rejection filter in the receiver of the ATV transmission system.

U.S. Pat. No. 5,572,249, issued on Nov. 5, 1996, the disclosure of which is incorporated herein by reference, the inventor of which is the present inventor, and the assignee of which is the assignee of the present invention, discloses a filter which can be used for co-channel NTSC inteference cancellation in an ATV system, without introducing excessive noise enhancement. More particularly, this filter could be used in a precoder in the ATV transmitter and the same filter used as a co-channel NTSC interference rejection filter in the ATV receiver. Of course, this entails the same drawbacks discussed above in connection with the Hulyalkar patents.

Based on the above and foregoing, it can be appreciated that there presently exists a need in the art for a digital receiver which overcomes the above-described drawbacks of the presently available technology. More particularly, there presently exists a need in the art for a digital receiver, e.g., an HDTV or ATV receiver, which is provided with a co-channel interference rejection filter which enables the realization of an ATV system in which the rejection filter in the receiver can be used alone to cancel co-channel interference, without requiring a precoder in the transmitter and without requiring any change in the transmitted bitstream. The present invention fulfills this need in the art.

SUMMARY OF THE INVENTION

The present invention encompasses a digital receiver (e.g., an ATV or HDTV receiver) which receives digital signals (e.g., ATV or HDTV signals), and which includes an equalizer for equalizing multipath channels having known co-channel interference (e.g., co-channel NTSC interference) present therein. In general, although the primary function of the equalizer is to equalize the multipath channels, in the presence of co-channel interference, the equalizer will normally attempt to cancel the co-channel interference as well. However, in accordance with one aspect of the present invention, a co-channel interference rejection filter is inserted in the digital receiver upstream of the equalizer, and the equalizer is modified in such a manner that it will not attempt to equalize the co-channel interference. Thus, co-channel interference cancellation is done primarily by the rejection filter, while multipath equalization (correction) is the exclusive function of the equalizer. This leads to better co-channel performance than that which can be obtained by relying on the equalizer alone to perform both functions. The co-channel interference rejection filter is preferably a multi-tap filter having fixed filter coefficients which are designed to optimize cancellation of the known co-channel interference. A suitable such rejection filter which can be employed in the practice of the present invention is the one disclosed in the above-referenced U.S. Pat. No. 5,572,249.

BRIEF DESCRIPTION OF THE DRAWINGS

These and various other features and aspects of the present invention will be readily understood with reference to the following detailed description read in conjunction with the accompanying drawings, in which.

DETAILED DESCRIPTION OF THE INVENTION

Figure 1:
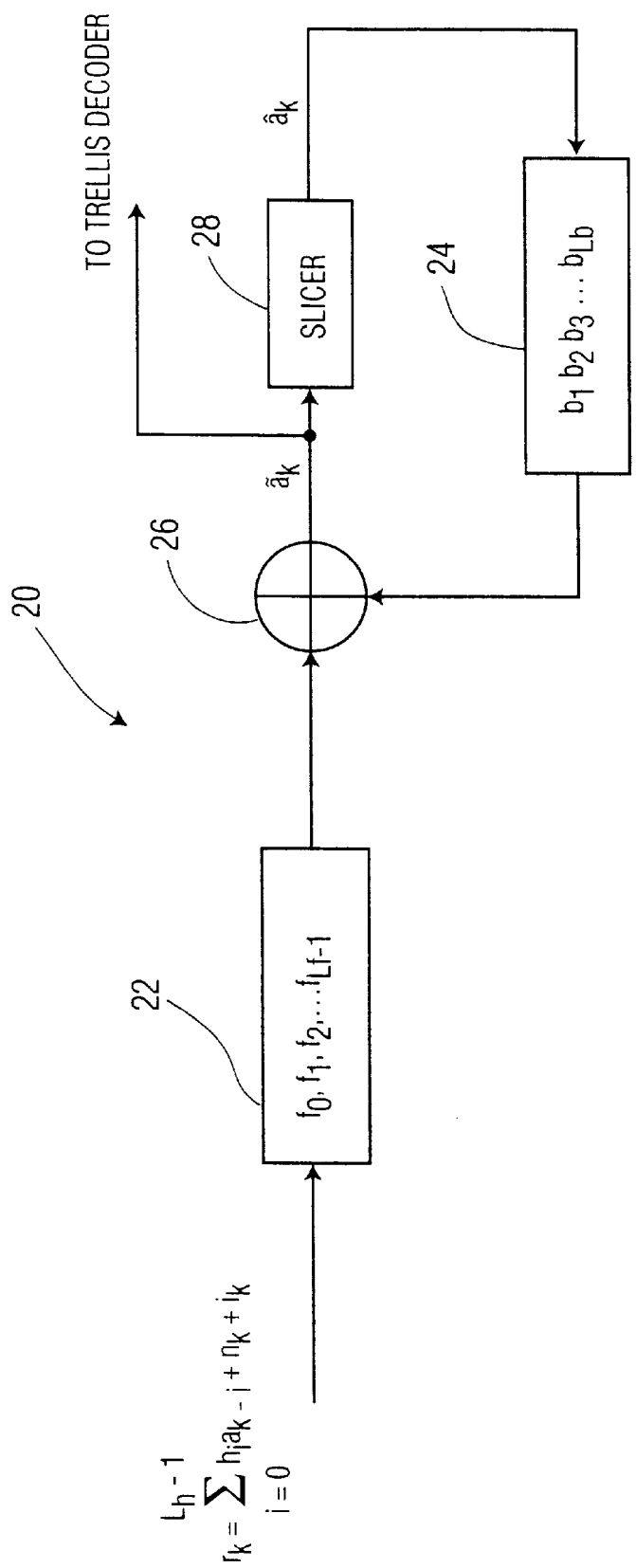
FIG. 1 is a block diagram of a conventional decision feedback equalizer.

With reference now to FIG. 1, a conventional decision feedback equalizer (DFE) 20 which is utilized to correct multipath and co-channel interference in conventional digital television receivers will now be described. The transmitted data stream, denoted $a_k$, is an 8-VSB signal, which has one of eight different discrete levels, i.e., $-7, -5, -3, -1, +1, +3, +5,$ and $+7$, where the subscript k represents the time index of the signal sampled at the A/D sampling rate. The input to the equalizer 20, i.e., the received data stream, denoted $r_k$, is the convolution of the transmitted data stream $a_k$ with the unknown multipath channel $h_k$ plus the additive noise, denoted $n_k$, and the co-channel interference, denoted $i_k$, as defined by the following equations (1) and (2):

$$r_k = h_k * a_k + n_k + i_k \quad (1)$$

$$= \sum_{i=0}^{L_h-1} h_i a_{k-i} + n_k + i_k \quad (2)$$

where * denotes convolution. Since the equalizer 20 functions to restore the transmitted data stream $a_k$, it will attempt to equalize the multipath channel component $h_k$ as well as the co-channel interference component $i_k$.

More particularly, the equalizer 20 includes a forward filter 22 which is a finite impulse response (FIR) filter having a plurality Lf of taps and respective filter coefficients $f_0$–$f_{Lf-1}$, where the delay between each tap is preferably equal to one symbol interval of the transmitted data stream, which is the reciprocal of the A/D sampling rate of the transmitted data stream, which in the case of the 8-VSB signal is 10.76 MHz. The equalizer 20 also includes a feedback filter 24 which is an FIR filter having a plurality Lb of taps and respective filter coefficients $b_1$–$b_{Lb}$, where the delay between each tap is preferably equal to one symbol interval of the transmitted data stream, which is the reciprocal of the A/D sampling rate of 10.76 MHz. The equalizer 20 further includes an adder (or subtractor) 26 which subtracts the output of the feedback filter 24 from the output of the forward filter 22. The output of the forward filter is $f_k * r_k$, and the output of the feedback filter 24 is $b_k * \hat{a}_k$. The output of the adder 26 is $\tilde{a}_k = f_k * r_k - b_k * \hat{a}_k$. The output $\tilde{a}_k$ of the adder 26 is taken as the output of the equalizer 20, and is supplied to the trellis decoder (not shown) of the digital receiver. The equalizer 20 also includes a slicer 28 which "slices" the output $\tilde{a}_k$ to one of the eight possible discrete values of the 8-VSB signal, i.e., $-7, -5, -3, -1, +1, +3, +5,$ and $+7$.

Figure 2:
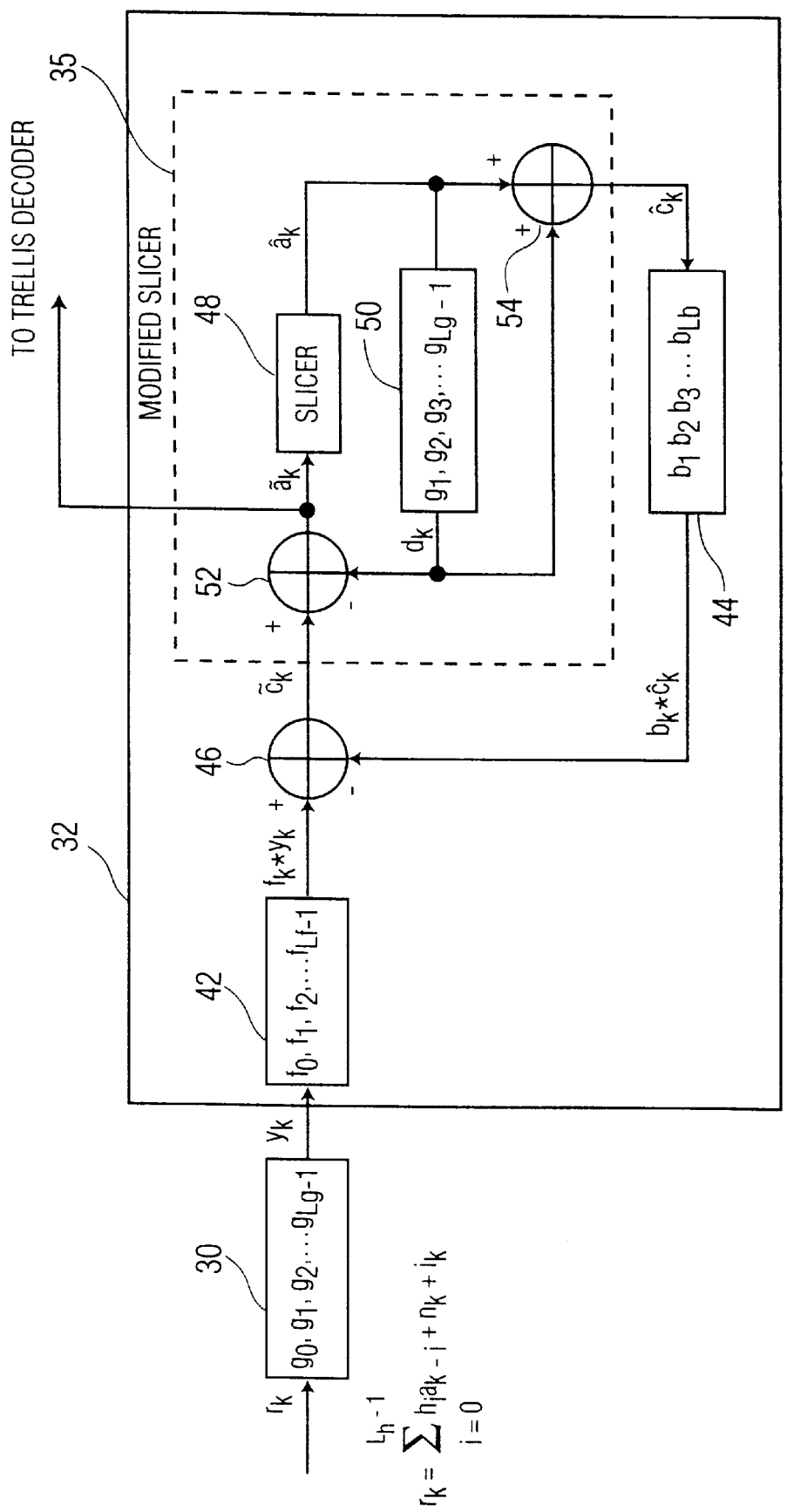
FIG. 2 is a block diagram of a combination which includes a co-channel interference rejection filter and a modified decision feedback equalizer which constitutes a first preferred embodiment of the present invention; and, FIG. 3 is a block diagram of a combination which includes a co-channel interference rejection filter and a modified decision feedback equalizer which constitutes a second preferred embodiment of the present invention.

With reference now to FIG. 2, a preferred embodiment of the present invention will now be described. More particularly, in accordance with this embodiment of the present invention, a digital receiver includes a co-channel interference rejection filter 30 which functions to cancel known co-channel interference in a received data stream $r_k$, and a decision feedback equalizer (DFE) 32 which functions to equalize multipath channels of the data stream. In accordance with an aspect of the present invention, the equalizer 32 is designed so that it will not attempt to equalize the co-channel interference. In a presently contemplated implementation of this embodiment of the present invention, the digital receiver is an HDTV receiver, the known co-channel interference is co-channel NTSC interference, and the received data stream $r_k$ is the convolution of the transmitted data stream $a_k$ with the unknown multipath channel $h_k$ plus the additive noise, denoted $n_k$, and the co-channel interference, denoted $i_k$, as defined by the equations (1) and (2) above, where the transmitted data stream $a_k$ is an 8-VSB signal. However, this is not limiting to the present invention, as the present invention has applicability to any digital receiver which receives signals corrupted with known co-channel interference.

With continuing reference to FIG. 2, the received data stream $r_k$ is input to the rejection filter 30. In the most general case, the rejection filter 30 is a finite impulse response (FIR) filter having a plurality Lg of taps and respective filter coefficients $g_0$–$g_{Lg-1}$. The filter coefficients $g_0$–$g_{Lg-1}$ can be selected in any manner which results in cancellation (or reduction) of the known co-channel interference, without excessively enhancing the noise. For example, the co-channel inteference rejection filter disclosed in the above-referenced U.S. Pat. No. 5,572,249 can suitably be employed, in which the filter coefficient $g_0$ is selected to have a value of 1 and all the other filter coefficients selected to have values less than 1, i.e., the filter is causal. For purposes of the present disclosure, it will be assumed that the rejection filter 30 (or $g_k$) is a co-channel interference rejection filter of this type. However, it should be clearly understood that this is not limiting to the present invention.

The output of the rejection filter 30, denoted $y_k$, (which is the input to the DFE 32), is defined by the following equation (3):

$$y_k = c_k * h_k + i_k * g_k + n_k * g_k, \quad (3)$$

where * denotes convolution, $c_k$ denotes the response of the rejection filter 30 to the transmitted data stream $a_k$, $i_k$ denotes the known co-channel interference, $n_k$ denotes the additive noise present in the received signal, $h_k$ denotes the unknown multipath channel, and the subscript k denotes the time index of the received signal sampled at the A/D sampling rate, e.g., 10.76 MHz. The rejection filter 30 is designed to minimize the second quantity ($i_k * g_k$) in the above equation (3), i.e., the co-channel interference component, while not excessively enhancing the third quantity ($n_k * g_k$) in the above equation (3), i.e., the noise component.

The DFE 32, in accordance with the present invention, is designed to not attempt to restore the transmitted data stream $a_k$, because in order to do so, the DFE 32 would have to undo the effect of the rejection filter 30. Instead, the DFE 32 functions to reconstruct the sequence $c_k$, which is defined by the following equation (4):

$$c_k = g_k * a_k = \sum_{i=0}^{L_g - 1} g_i a_{k-i} \quad (4)$$

With continuing reference to FIG. 2, the DFE 32 of the present invention has the same architecture as that of the conventional DFE 20 depicted in FIG. 1, with the exception that the DFE 32 of the present invention has a modified slicer 35 whose function will be described below. More particularly, the DFE 32 includes a forward filter 42 which is a finite impulse response (FIR) filter having a plurality Lf of taps and respective filter coefficients $f_0 - f_{L_f - 1}$, where the delay between each tap is preferably equal to one symbol interval of the transmitted data stream, which is the reciprocal of the A/D sampling rate of the transmitted data stream, which in the case of the 8-VSB signal is 10.76 MHz. Thus, the forward filter 42 of the DFE 32 of the present invention is of the same design as the forward filter 22 of the conventional DFE 20. The DFE 32 also includes a feedback filter 44 which is an FIR filter having a plurality Lb of taps and respective filter coefficients $b_1 - b_{L_b}$, where the delay between each tap is preferably equal to one symbol interval of the transmitted data stream, which is the reciprocal of the A/D sampling rate of 10.76 MHz. Thus, the feedback filter 44 of the DFE 32 of the present invention is of the same design as the feedback filter 24 of the conventional DFE 20. The DFE 32 further includes an adder (or subtractor) 46 which subtracts the output of the feedback filter 44 from the output of the forward filter 42. Thus, the adder 46 of the DFE 32 of the present invention is of the same design as the adder 26 of the conventional DFE 20.

However, since the input to the forward filter 42 is $y_k$, the output of the forward filter 42 is $f_k * y_k$, and since the input to the feedback filter 44 is $\hat{c}_k$, the output of the feedback filter 44 is $b_k * \hat{c}_k$. Thus, the output of the adder 46, denoted $\tilde{c}_k$, is defined by the following equation (5):

$$\tilde{c}_k = f_k * y_k - b_k * \hat{c}_k. \quad (5)$$

As will become apparent hereinafter, $\hat{c}_k$ is the "sliced" version of $\tilde{c}_k$. The output $\tilde{a}_k$ of the adder 52 is taken as the output of the DFE 32, and is supplied to the trellis decoder (not shown) of the digital receiver.

The DFE 32 operates in the following manner. More particularly, a known periodic sequence, referred to as the "training sequence", is inserted in the transmitted data stream $a_k$ at the transmitter, in accordance with the MPEG-2 Grand Alliance ATV/HDTV Transmitter Standard, in order to enable the equalizer in the receiver to converge thereon and thereby be synchronized with the subsequent actual data in the transmitted data stream. During this "training sequence", since $a_k$ is known, and since the rejection filter coefficients $g_k$ are also known, $c_k$ can be easily calculated. However, after the equalizer has converged on the "training sequence", since $a_k$ is no longer known, then $c_k$ also becomes unknown. The feedback filter 44 still requires the "sliced" version $\hat{c}_k$ of $\tilde{c}_k$ at its input in order to function properly. Thus, since $c_k$ is no longer composed of discrete levels like the transmitted data stream $a_k$, $\tilde{c}_k$ can not be sliced in the usual manner.

Therefore, without any modification to the standard slicer 28 which is utilized in the conventional DFE 20 (depicted in FIG. 1), the "sliced" version $\hat{c}_k$ of $\tilde{c}_k$ can not be supplied the input of the feedback filter 44, as required. For this reason, the "modified slicer" 35 is included in the DFE 32 of the present invention. The modified slicer 35 includes, in addition to a standard slicer 48, an additional feedback filter 50 and two additional adders 52 and 54. The feedback filter 50 is provided with the same filter coefficients $g_k$ as those of the co-channel interference rejection filter 30. The input to the additional feedback filter 50 is $\hat{a}_k$, and the output of the feedback filter, denoted $d_k$, is defined by the following equation (6):

$$d_k = \tilde{c}_k - \hat{a}_k. \quad (6)$$

The output $d_k$ of the additional feedback filter 50 is applied as the inverted input of the adder 52 and as one of the non-inverted inputs to the adder 54. Thus, the output $\hat{c}_k$ of the adder 54 is defined by the following equation (8):

$$\hat{a}_k + d_k = \hat{c}_k, \quad (8)$$

which is the input (as required) to the feedback filter 44. The output $\tilde{a}_k$ of the adder 52 is defined by the following equation (9):

$$\tilde{c}_k - d_k = \tilde{a}_k, \quad (9)$$

which is taken as the output of the DFE 32 and supplied to the next stage of the receiver, i.e., the trellis decoder.

It can be easily seen from equation (4) above that the following relation holds between $c_k$ and $a_k$, assuming $g_0$ is 1:

$$a_k = c_k - \sum_{i=1}^{L_g - 1} g_i a_{k-i} \quad (10)$$

Hence, in the modified slicer 35, $\tilde{a}_k$ can be reconstructed from the equalizer output $\tilde{c}_k$ and past decisions $\hat{a}_k$ as follows:

$$\tilde{a}_k = \tilde{c}_k - \sum_{i=1}^{L_g - 1} g_i \hat{a}_{k-i} = \tilde{c}_k - d_k. \quad (11)$$

$\tilde{a}_k$ can be sliced in the normal manner by the standard slicer 48 to give $\hat{a}_k$. Finally, the output $\hat{c}_k$ of the adder 54, which is the input (as required) to the feedback filter 44, is obtained as follows:

$$\tilde{c}_k = \hat{a}_k + \sum_{i=0}^{L_g-1} g_i \hat{a}_{k-i} = \hat{a}_k - d_k. \quad (12)$$

Figure 3:
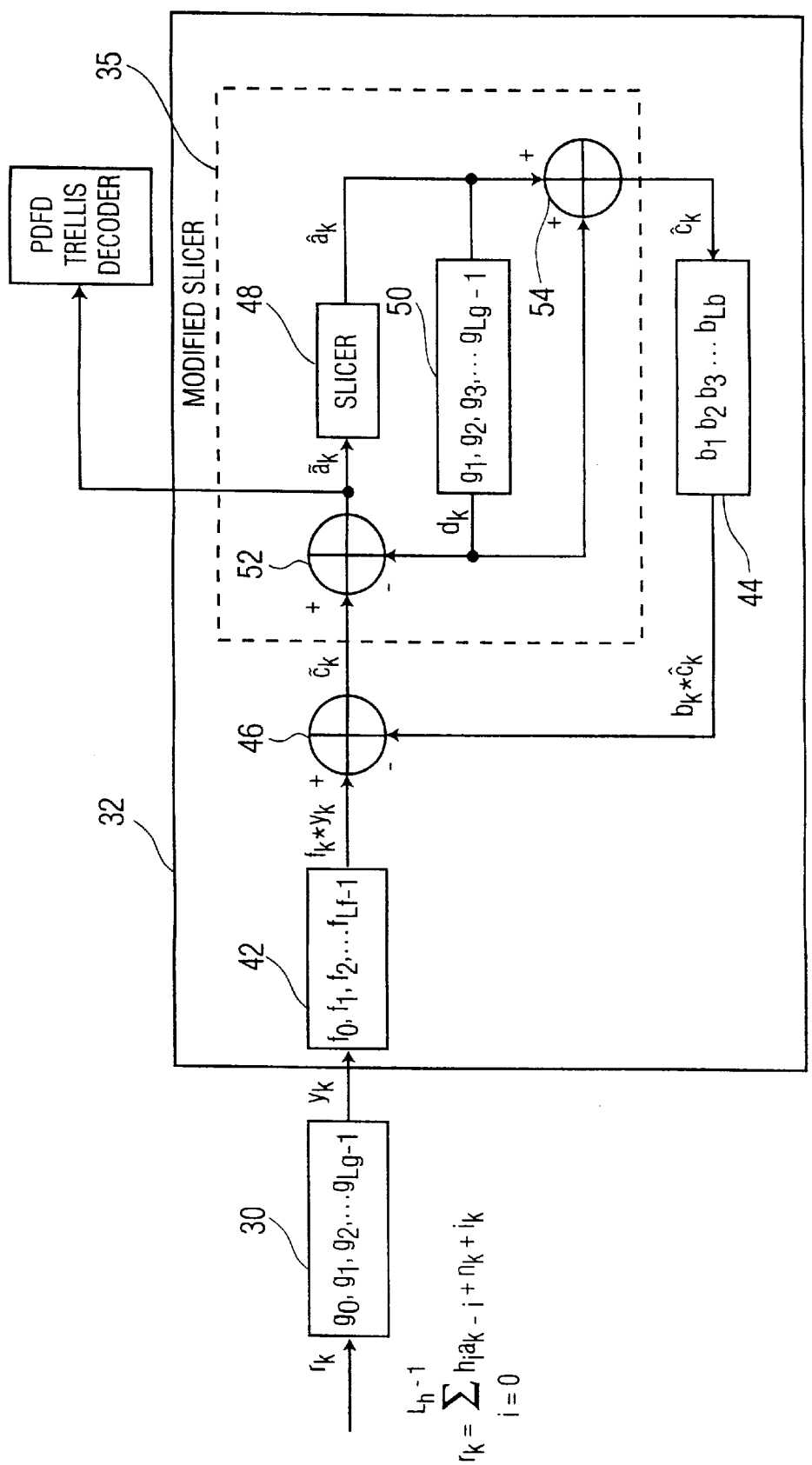

With reference now to FIG. 3, there can be seen an alternative embodiment of the present invention. The only difference between this embodiment and the one depicted in FIG. 2 is that $\tilde{c}_k$ is taken as the output of the DFE 32, instead of $\tilde{a}_k$, and supplied as the input to the trellis decoder. Because the trellis decoder will have $\tilde{c}_k$ rather than $\tilde{a}_k$ as its input, it will have to be modified. More particularly, with this embodiment, the trellis decoder will have to be implemented as a parallel decision feedback decoder (PDFD), i.e., it will have a separate decision feedback part for each state, such as is disclosed in an article entitled "Delayed decision-feedback sequence estimation", *IEEE Trans. Commum.*, Vol. COM-37, No. 5, pp. 428–436, May 1989, the disclosure of which is incorporated herein by reference. The number of states in the PDFD remain the same as in the original trellis decoder. However, each state has associated with it a best path that is $L_g-1$ symbols long that is used for the metric calculation procedure. The advantage of this embodiment as compared to that of the embodiment depicted in FIG. 2 is that it will suffer less from error propagation and hence will exhibit improved performance. However, the complexity of this implementation is increased due to the additional storage and filtering requirements.

Although preferred and alternative embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims. For example, although the present invention has been discussed in the context of simultaneous broadcasting of HDTV/ATV and NTSC television signals wherein co-channel NTSC interference is a concern, it will be readily appreciated that the present invention is equally applicable to the context of HDTV/ATV and SECAM or PAL television signals, or any other conventionally broadcast television signals. Moreover, as was previously noted, the present invention has applicability to any digital receiver which receives signals corrupted with known co-channel interference.

What is claimed is:

1. A digital receiver for receiving, over unknown multipath channels, a digital signal corrupted by noise and co-channel interference, the digital receiver comprising:
    a co-channel interference rejection filter for reducing the co-channel interference in order to produce a first output, the co-channel interference rejection filter comprising a first finite impulse response filter having a plurality of taps and respective coefficients whose values have been selected to reduce the co-channel interference; and
    a decision feedback equalizer for receiving said first output and for using a second finite impulse response filter in substantially equalizing the unknown multipath channels without attempting to cancel the co-channel interference.

2. The digital receiver as set forth in claim 1, wherein said co-channel interference rejection filter is non-adaptive and is configured to minimize co-channel interference without substantially enhancing the noise.

3. A digital receiver for receiving a digital signal over unknown multipath channels corrupted by noise and co-channel interference, the digital receiver comprising:
    a co-channel interference rejection filter for minimizing the co-channel interference and for producing a first output; and
    an equalizer for receiving said first output and for equalizing the unknown multipath channels, without attempting to cancel the co-channel interference, wherein said equalizer comprises:
    a forward filter for receiving said first output and for producing a second output;
    a first adder having a first input coupled to said second output, and a second input, wherein said first adder produces a third output;
    a second adder having a first input coupled to said third output, and a second input, wherein said second adder produces a fourth output;
    a slicer for slicing said fourth output to thereby produce a sliced version of said fourth output;
    a third adder having a first input coupled to said sliced version of said fourth output, and a second input, wherein said third adder produces a fifth output;
    an equalizer feedback filter for receiving said fifth output and for producing a sixth output which is coupled to said second input of said first adder, wherein said third output comprises the difference between said second output and said sixth output;
    a slicer feedback filter for receiving said sliced version of said fourth output and for producing a seventh output which is coupled to said second input of said second adder and to said second input of said third adder, wherein said fourth output comprises the difference between said third output and said seventh output, and said fifth output comprises the sum of said seventh output and said sliced version of said fourth output; and
    wherein an output of said equalizer comprises said fourth output.

4. A digital receiver for receiving a digital signal over unknown multipath channels corrupted by noise and co-channel interference, the digital receiver comprising:
    a co-channel interference rejection filter for minimizing the co-channel interference and for producing a first output; and
    an equalizer for receiving said first output and for equalizing the unknown multipath channels, without attempting to cancel the co-channel interference, wherein said equalizer comprises:
    a forward filter for receiving said first output and for producing a second output;
    a first adder having a first input coupled to said second output, and a second input, wherein said first adder produces a third output;
    a second adder having a first input coupled to said third output, and a second input, wherein said second adder produces a fourth output;
    a slicer for slicing said fourth output to thereby produce a sliced version of said fourth output;
    a third adder having a first input coupled to said sliced version of said fourth output, and a second input, wherein said third adder produces a fifth output;
    an equalizer feedback filter for receiving said fifth output and for producing a sixth output which is coupled to said second input of said first adder, wherein said third output comprises the difference between said second output and said sixth output;
    a slicer feedback filter for receiving said sliced version of said fourth output and for producing a seventh output which is coupled to said second input of said second adder and to said second input of said third adder, wherein said fourth output comprises the difference between said third output and said seventh output, and said fifth output comprises the sum of said seventh output and said sliced version of said fourth output; and wherein an output of said equalizer comprises said third output.

5. The digital receiver as set forth in claim 3, wherein said forward filter comprises a finite impulse response filter having a plurality of taps and respective filter coefficients.

6. The digital receiver as set forth in claim 5, wherein said equalizer feedback filter comprises a finite impulse response filter having a plurality of taps and respective filter coefficients.

7. The digital receiver as set forth in claim 6, wherein said slicer feedback filter comprises a finite impulse response filter having a plurality of taps and respective filter coefficients.

8. The digital receiver as set forth in claim 3, wherein:
the co-channel interference is known co-channel interference; and,
said co-channel interference rejection filter comprises a finite impulse response filter having a plurality of taps and respective filter coefficients whose values are selected to minimize the known co-channel interference; and,
said slicer feedback filter comprises a finite impulse response filter having a plurality of taps and respective filter coefficients whose values are the same as those of said filter coefficients of said co-channel interference rejection filter.

9. The digital receiver as set forth in claim 1, wherein the digital receiver is a digital television receiver.

10. The digital receiver as set forth in claim 1, wherein:
the digital receiver is a digital television receiver;
the digital signal is an 8-VSB signal;
the co-channel interference is co-channel NTSC interference.

11. The digital receiver as set forth in claim 8, wherein:
the digital receiver is a digital television receiver;
the digital signal is an 8-VSB signal;
the co-channel interference is co-channel NTSC interference.

12. The digital receiver as set forth in claim 3, wherein:
the co-channel interference is known co-channel interference; and,
said co-channel interference rejection filter comprises a finite impulse response filter having a plurality Lg of taps and respective filter coefficients $g_0$–$g_{Lg-1}$ whose values are selected to minimize the known co-channel interference;
said forward filter comprises a finite impulse response filter having a plurality Lf of taps and respective filter coefficients $f_0$–$f_{Lf-1}$;
said equalizer feedback filter comprises a finite impulse response filter having a plurality Lb of taps and respective filter coefficients $b_1$–$b_{Lb}$;
said slicer feedback filter comprises a finite impulse response filter having a plurality Lg of taps and respective filter coefficients $g_0$–$g_{Lg-1}$ whose values are the same as the respective filter coefficients $g_0$–$g_{Lg-1}$ of said co-channel interference rejection filter.

13. The digital receiver as set forth in claim 4, wherein:
the co-channel interference is known co-channel interference; and,
said co-channel interference rejection filter comprises a finite impulse response filter having a plurality Lg of taps and respective filter coefficients $g_0$–$Lg_{-1}$ whose values are selected to minimize the known co-channel interference;
said forward filter comprises a finite impulse response filter having a plurality Lf of taps and respective filter coefficients $f_0$–$f_{Lf-1}$;
said equalizer feedback filter comprises a finite impulse response filter having a plurality Lb of taps and respective filter coefficients $b_1$–$b_{Lb}$;
said slicer feedback filter comprises a finite impulse response filter having a plurality Lg of taps and respective filter coefficients $g_0$–$g_{Lg-1}$ whose values are the same as the respective filter coefficients $g_0$–$g_{Lg-1}$ of said co-channel interference rejection filter.

14. The digital receiver as set forth in claim 12, wherein:
the received digital signal, denoted $r_k$, is the convolution of a transmitted data stream $a_k$, and is defined by the following equations (1) and (2):

$$r_k = h_k * a_k + n_k + i_k \tag{1}$$

$$= \sum_{i=0}^{L_h-1} h_i a_{k-1} + n_k + i_k \tag{2}$$

where * denotes convolution, $h_k$ represents the unknown multipath channels, $n_k$ represents the noise, $i_k$ represents the known co-channel interference, and the subscript k represents the time index of the digital signal sampled at a prescribed A/D sampling rate.

15. The digital receiver as set forth in claim 13, wherein:
the received digital signal, denoted $r_k$, is the convolution of a transmitted data stream $a_k$, and is defined by the following equations (1) and (2):

$$r_k = h_k * a_k + n_k + i_k \tag{1}$$

$$= \sum_{i=0}^{L_h-1} h_i a_{k-1} + n_k + i_k \tag{2}$$

where * denotes convolution, $h_k$ represents the unknown multipath channels, $n_k$ represents the noise, $i_k$ represents the known co-channel interference, and the subscript k represents the time index of the digital signal sampled at a prescribed A/D sampling rate.

16. The digital receiver as set forth in claim 14, wherein:
the digital receiver is a digital television receiver;
the digital signal is an 8-VSB signal;
the co-channel interference is co-channel NTSC interference.

17. The digital receiver as set forth in claim 15, wherein:
the digital receiver is a digital television receiver;
the digital signal is an 8-VSB signal,
the co-channel interference is co-channel NTSC interference.

18. The digital receiver as set forth in claim 14, wherein said first output is defined by the following equation (3):

$$y_k = c_k * h_k + i_k * g_k + n_k * g_k, \tag{3}$$

where $c_k$ is defined by the following equation (4):

$$c_k = g_k * a_k = \sum_{i=0}^{L_g-1} g_i a_{k-i}. \tag{4}$$

* * * * *